(12) United States Patent
Yang

(10) Patent No.: US 11,885,164 B2
(45) Date of Patent: Jan. 30, 2024

(54) COUPLING DEVICE AND TERMINAL EQUIPMENT

(71) Applicant: BEIJING XIAOMI MOBILE SOFTWARE CO., LTD., Beijing (CN)

(72) Inventor: Jieming Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 87 days.

(21) Appl. No.: 17/708,817

(22) Filed: Mar. 30, 2022

(65) Prior Publication Data

US 2023/0160243 A1 May 25, 2023

(30) Foreign Application Priority Data

Nov. 24, 2021 (CN) .......................... 202111407838.9

(51) Int. Cl.
| | |
|---|---|
| *E05D 7/00* | (2006.01) |
| *E05D 3/12* | (2006.01) |
| *E05D 3/18* | (2006.01) |
| *F16C 11/10* | (2006.01) |

(52) U.S. Cl.
CPC .............. *E05D 3/122* (2013.01); *E05D 3/18* (2013.01); *E05Y 2900/606* (2013.01); *F16C 11/10* (2013.01)

(58) Field of Classification Search
CPC .. E05D 3/12; E05D 3/18; E05D 3/122; E05D 3/06; E05D 3/10; E05D 7/0045; E05D 11/082; E05D 11/087; E05D 2011/085; E05D 2007/0072; G06F 1/1681; G06F 1/1616; G06F 1/1618; G06F 1/168; E05Y 2900/606; E05Y 2900/602; H04M 1/0216; H04M 1/0222; H04M 1/022; H05K 5/0226; F16C 11/04; F16C 11/10; F16C 16/345; F16C 16/366–371
See application file for complete search history.

(56) References Cited

U.S. PATENT DOCUMENTS

| | | | |
|---|---|---|---|
| 9,103,147 B1* | 8/2015 | Chuang | G06F 1/1681 |
| 10,480,225 B1* | 11/2019 | Hsu | E05D 3/12 |
| 10,551,880 B1* | 2/2020 | Ai | G06F 1/1641 |
| 10,761,573 B2* | 9/2020 | Hsu | G06F 1/1681 |
| 11,061,443 B2* | 7/2021 | Lin | H04M 1/0214 |
| 11,435,785 B2* | 9/2022 | Song | G06F 1/1652 |

(Continued)

*Primary Examiner* — Chuck Y Mah
(74) *Attorney, Agent, or Firm* — COZEN O'CONNOR

(57) ABSTRACT

A terminal device with a folding screen includes a coupling device with a middle frame fixing member, a first transmission assembly, a second transmission assembly and a third transmission assembly. A first transmission assembly is rotatable relative to the middle frame fixing member during rotation of the middle frame fixing member. The second transmission assembly has a first end hinged to the first transmission assembly and a second end slidably coupled to the first transmission assembly, and the second transmission assembly converts a rotation action of the first transmission assembly into a moving action along a second direction. A third end of the third transmission assembly pushes the middle frame fixing member to move towards a first side facing away from the first transmission assembly or a second side towards the first transmission assembly during the rotation of the middle frame fixing member.

20 Claims, 13 Drawing Sheets

(56) References Cited

U.S. PATENT DOCUMENTS

| | | | |
|---|---|---|---|
| 11,726,530 B2 * | 8/2023 | Kang | G06F 1/1652 |
| | | | 361/679.27 |
| 2020/0097051 A1 * | 3/2020 | Liu | G06F 1/1652 |
| 2020/0233466 A1 * | 7/2020 | Sanchez | H05K 5/0017 |
| 2020/0315047 A1 * | 10/2020 | Kang | G06F 1/1616 |
| 2020/0409427 A1 * | 12/2020 | Hsu | E05D 1/04 |
| 2021/0096607 A1 * | 4/2021 | Hallar | G06F 1/1681 |
| 2021/0368032 A1 * | 11/2021 | Liao | G06F 1/1681 |
| 2022/0086265 A1 * | 3/2022 | Shang | H04M 1/0268 |
| 2022/0377919 A1 * | 11/2022 | Zhang | F16C 11/04 |
| 2022/0412138 A1 * | 12/2022 | Peng | G06F 1/1681 |
| 2023/0229203 A1 * | 7/2023 | Hsiang | G06F 1/1681 |
| | | | 361/679.27 |
| 2023/0244274 A1 * | 8/2023 | Lin | G06F 1/1652 |
| | | | 361/679.27 |

* cited by examiner

COUPLING DEVICE AND TERMINAL EQUIPMENT

CROSS-REFERENCE TO RELATED APPLICATIONS

This application is based on and claims priority to Chinese Patent Application No. 202111407838.9 filed on Nov. 24, 2021, the entire contents of which are incorporated herein by reference.

BACKGROUND

Terminal equipment, such as a mobile device, with a foldable screen has become a focus of competition among manufacturers of terminal equipment. In order to ensure a normal folding function of the screen of the terminal equipment, a hinge for coupling two middle frames is arranged at a position where a screen is folded. Since the screen has a certain thickness, a length of a front surface and a length of a back surface of the screen after being folded may be different, and thus wrinkles are formed in the screen after it is folded. This may cause damage to the screen and affect the normal use of the terminal equipment.

SUMMARY

The present disclosure relates to the field of mobile terminals and, more particularly, to a coupling device and terminal equipment.

A coupling device according to the embodiments of the present disclosure includes: a middle frame fixing member; a first transmission assembly rotatable relative to the middle frame fixing member during rotation of the middle frame fixing member; a second transmission assembly having a first end hinged to the first transmission assembly at a first hinge center and having a second end slidably coupled to the first transmission assembly. A rotation center of the first transmission assembly does not coincide with the first hinge center, and the second transmission assembly converts a rotation action of the first transmission assembly into a moving action along a second direction; and a third transmission assembly having a first end hinged to the second transmission assembly and having a second end and a third end both slidably coupled to the middle frame fixing member. The second end and the third end of the third transmission assembly are on two sides of the first end of the third transmission assembly, and the third end of the third transmission assembly pushes the middle frame fixing member to move towards a first side facing away from the first transmission assembly or a second side towards the first transmission assembly during the rotation of the middle frame fixing member.

Terminal equipment according to embodiments of another aspect of the present disclosure includes a screen and a coupling device coupled to the screen. The coupling device includes: a middle frame fixing member; a first transmission assembly rotatable relative to the middle frame fixing member during rotation of the middle frame fixing member; a second transmission assembly having a first end hinged to the first transmission assembly at a first hinge center and having a second end slidably coupled to the first transmission assembly. A rotation center of the first transmission assembly does not coincide with the first hinge center, and the second transmission assembly converts a rotation action of the first transmission assembly into a moving action along a second direction; and a third transmission assembly having a first end hinged to the second transmission assembly and having a second end and a third end both slidably coupled to the middle frame fixing member. The second end and the third end of the third transmission assembly are on two sides of the first end of the third transmission assembly, and the third end of the third transmission assembly pushes the middle frame fixing member to move towards a first side facing away from the first transmission assembly or a second side towards the first transmission assembly during the rotation of the middle frame fixing member.

DETAILED DESCRIPTION OF EMBODIMENTS

Figure 1:
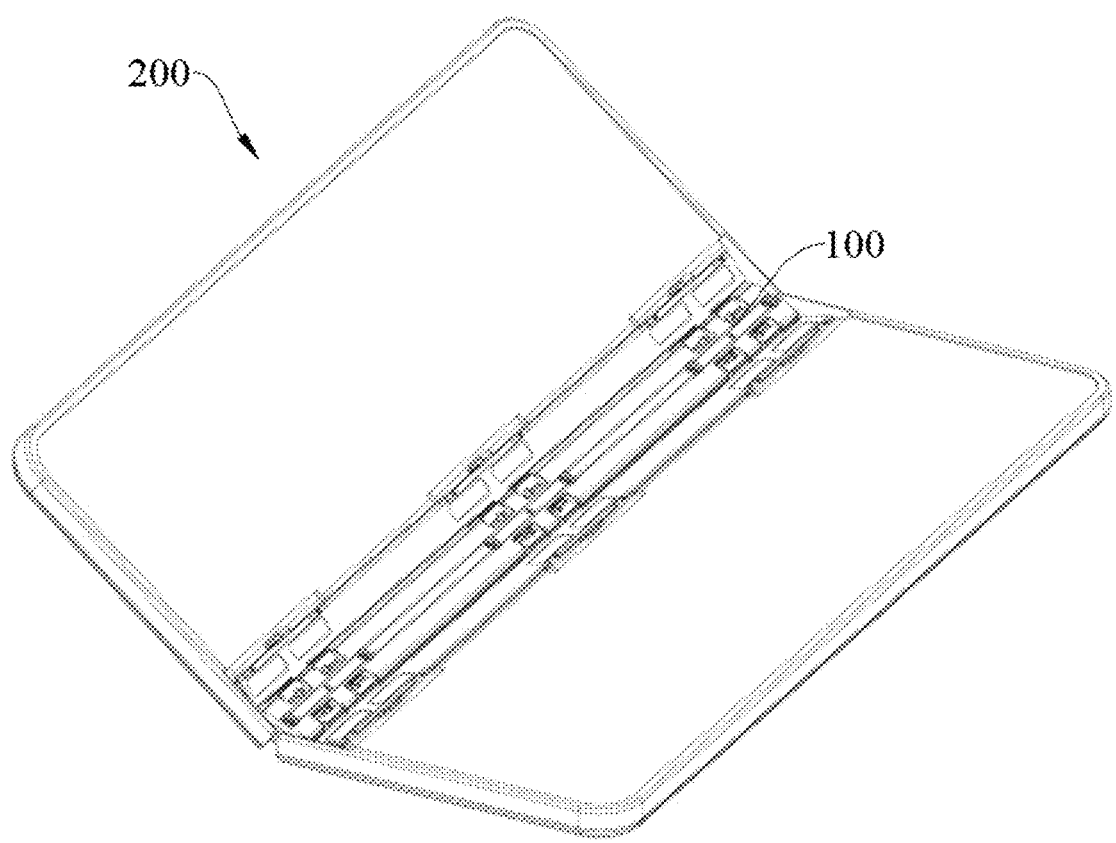
FIG. 1 is a schematic view of terminal equipment according to an embodiment of the present disclosure.
Figure 2:
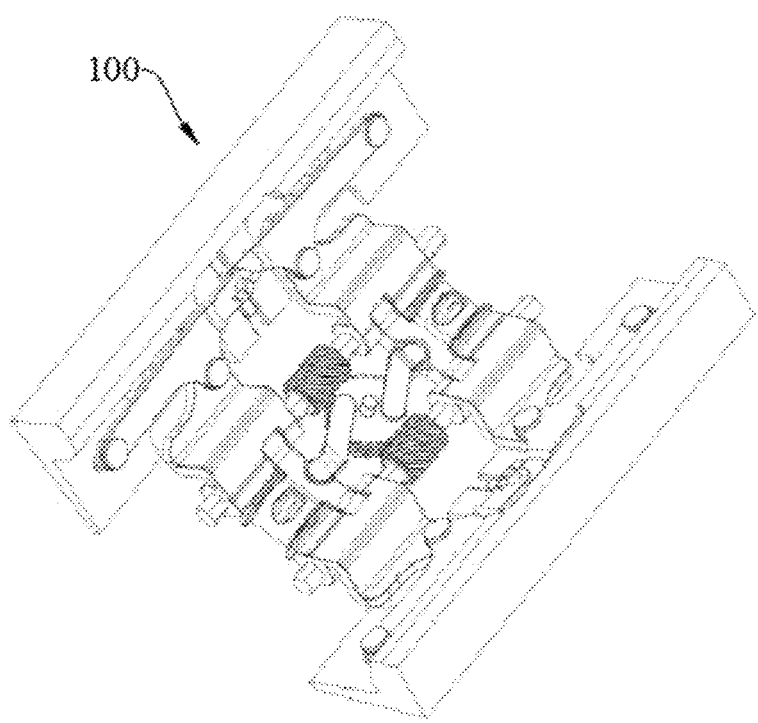
FIG. 2 is a schematic view of a coupling device according to an embodiment of the present disclosure.

Embodiments of the present disclosure will be described in detail below, and examples of the described embodiments are shown in accompanying drawings. The following embodiments described with reference to the accompanying drawings are exemplary and are intended to explain the present disclosure rather than limit the present disclosure.

A coupling device 100 according to embodiments of the present disclosure will be described below with reference to the accompanying drawings.

As shown in FIGS. 1 to 24, the coupling device 100 according to the embodiments of the present disclosure includes a middle frame fixing member 2, a first transmission assembly 3, a second transmission assembly 4, and a third transmission assembly 5.

The middle frame fixing member 2 is configured to mount a middle frame, and may rotate along with the middle frame and a screen 8. The first transmission assembly 3 may rotate relative to the middle frame fixing member 2 during rotation of the middle frame fixing member 2, i.e., the rotation of the middle frame fixing member 2 may drive the first transmission assembly 3 to rotate.

Figure 3:
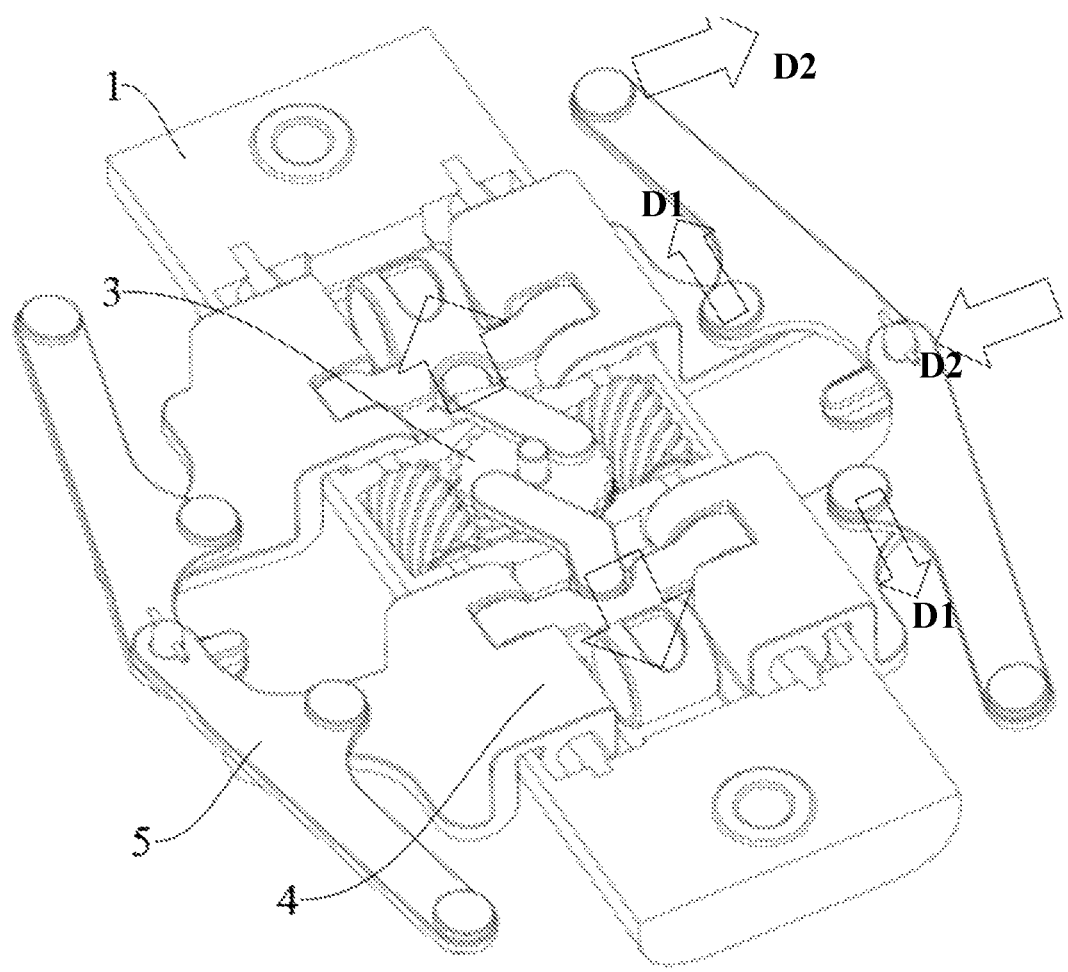
FIG. 3 is a schematic view showing power transmission of a coupling device according to an embodiment of the present disclosure.
Figure 4:
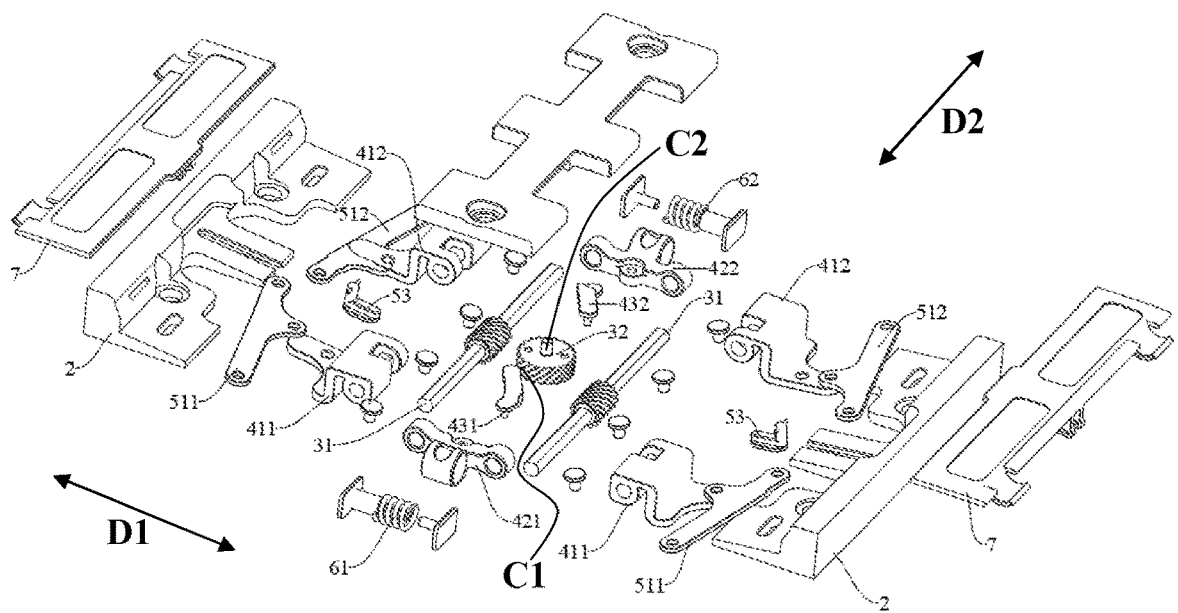
FIG. 4 is an exploded view of a coupling device according to an embodiment of the present disclosure.
Figure 5:
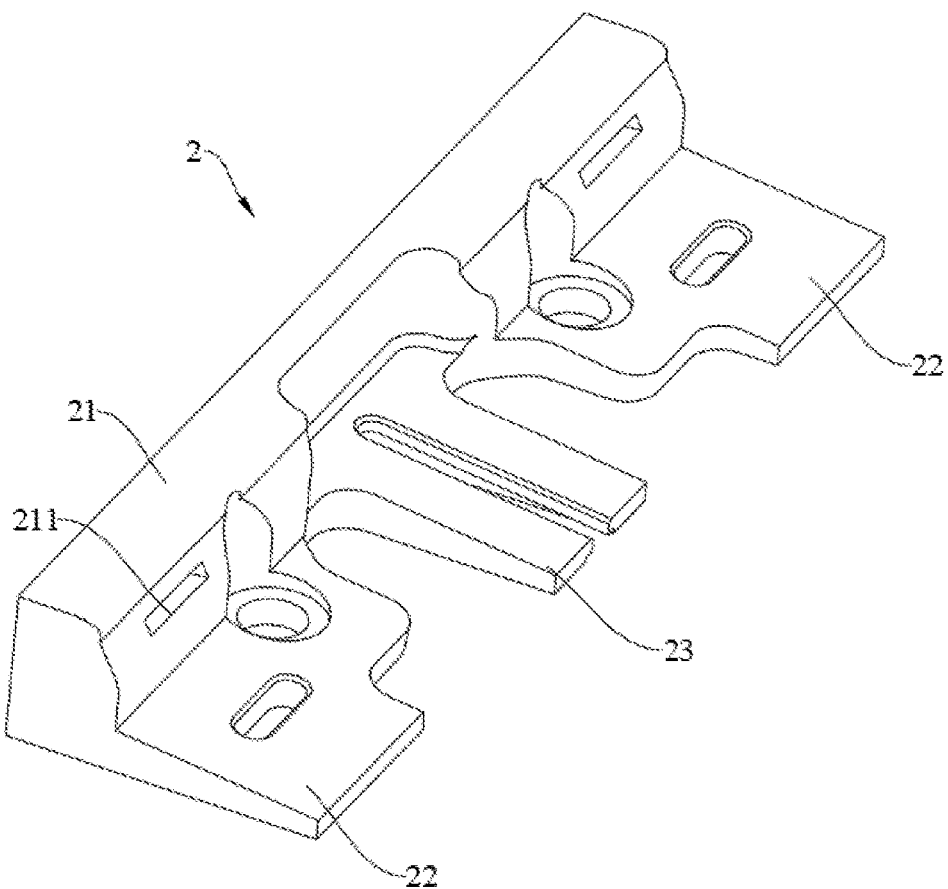
FIG. 5 is a schematic view of a middle frame fixing member according to an embodiment of the present disclosure.

A first end of the second transmission assembly 4 is hinged to the first transmission assembly 3 at a first hinge center C1, a rotation center C2 of the first transmission assembly 3 does not coincide with the first hinge center C1, and a second end of the second transmission assembly 4 is slidably coupled to the first transmission assembly 3. The second transmission assembly 4 is configured to convert a rotation action of the first transmission assembly 3 into a moving action along a second direction D2 (as shown in FIGS. 3-4). It should be understood that the first transmission assembly 3 and the second transmission assembly 4 form a mechanism similar to a crank connecting rod. The first transmission assembly 3 and the second transmission assembly 4 are combined together, to convert a rotation action of the middle frame into a moving action along the second direction.

The third transmission assembly 5 has a bracket structure similar to a triangle. The third transmission assembly 5 has a first end, a second end and a third end. The first end of the third transmission assembly 5 is hinged to the second transmission assembly 4, and the second end and the third end of the third transmission assembly 5 are slidably coupled to the middle frame fixing member 2. The second end and the third end of the third transmission assembly 5 are located on two sides of the first end of the third transmission assembly 5 in the second direction. The third end of the third transmission assembly 5 is configured to push the middle frame fixing member 2 to move towards a first side facing away from the first transmission assembly 3 or a second side towards the first transmission assembly 3 during the rotation of the middle frame fixing member 2.

It should be noted that based on a lever principle, the first end of the third transmission assembly serves as a fulcrum, and as the second transmission assembly 4 moves along the second direction, the second end and the third end of the third transmission assembly move along a direction opposite to the second direction. Thus, in a process of folding the screen 8, the middle frame fixing member 2 drives the middle frame to move along the first side facing away from the first transmission assembly 3 or the second side towards the first transmission assembly 3, so that a length of the screen 8 may be accurately compensated, avoiding wrinkles of the screen 8 and prolonging the service life of the screen 8.

Figure 13:
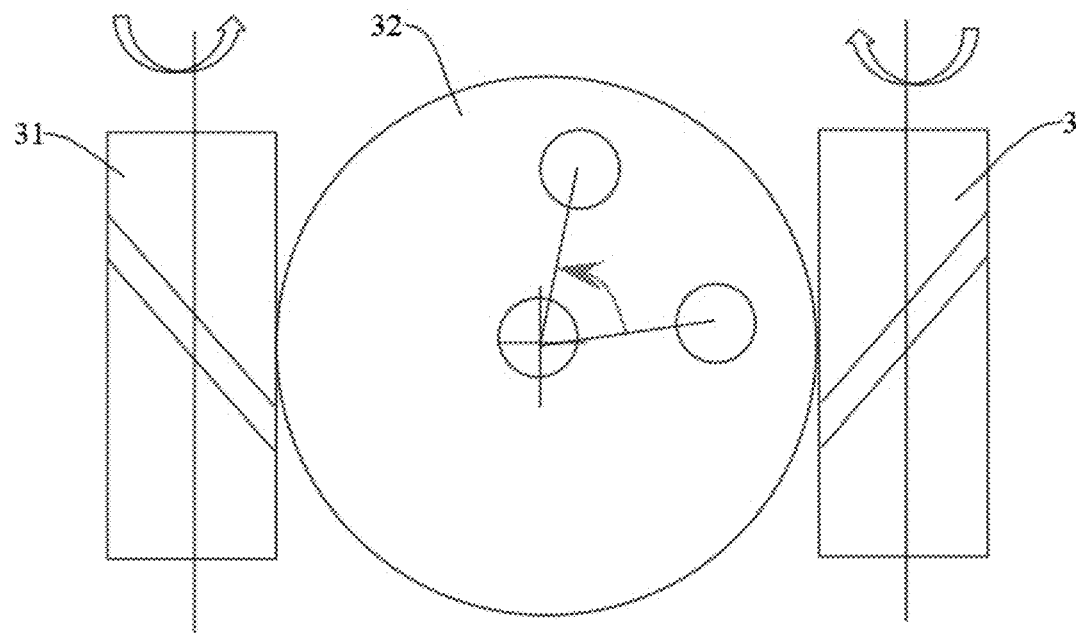
FIG. 13 is a schematic view showing a transmission principle of a first transmission assembly according to an embodiment of the present disclosure.
Figure 14:
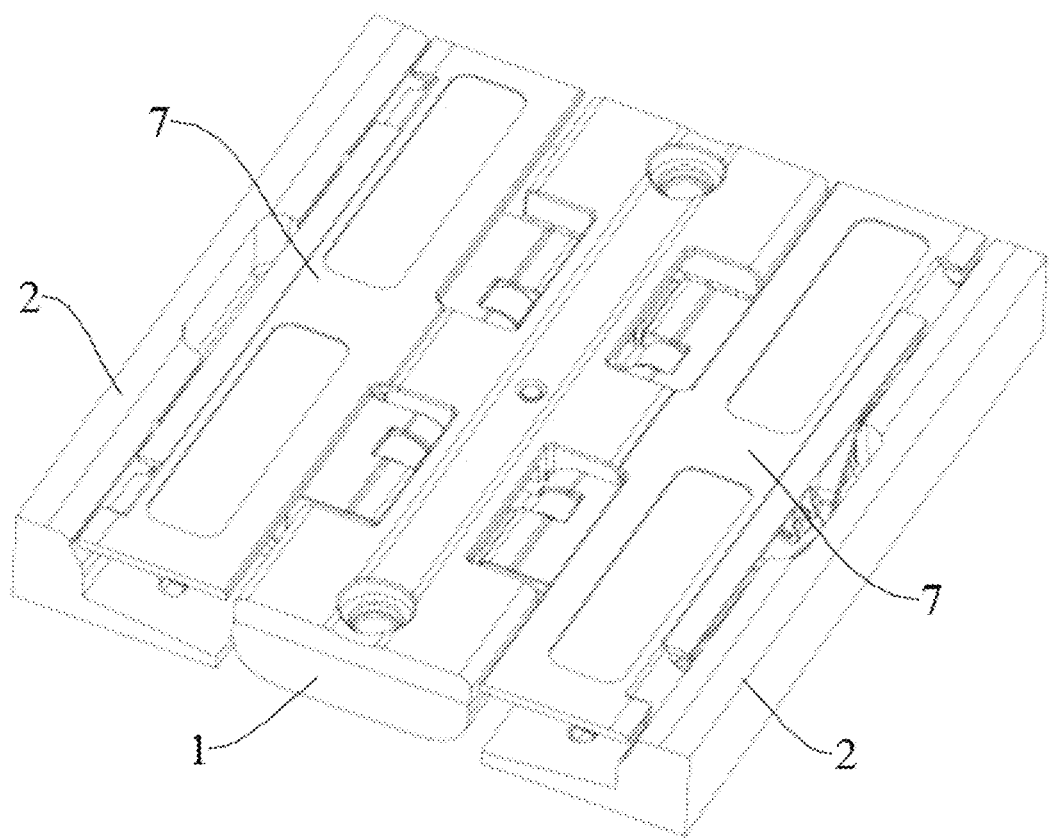
FIG. 14 is a schematic view of a coupling device in a flattened state according to an embodiment of the present disclosure.
Figure 15:
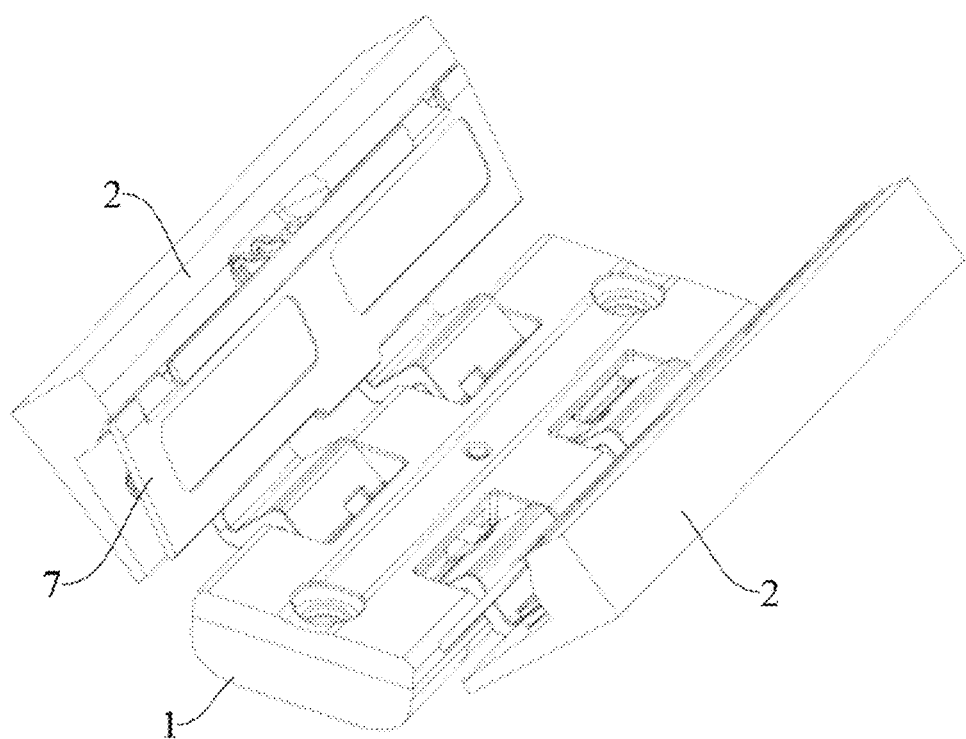
FIG. 15 is a schematic view showing that a coupling device rotates from a flattened state to a closed state according to an embodiment of the present disclosure.
Figure 16:
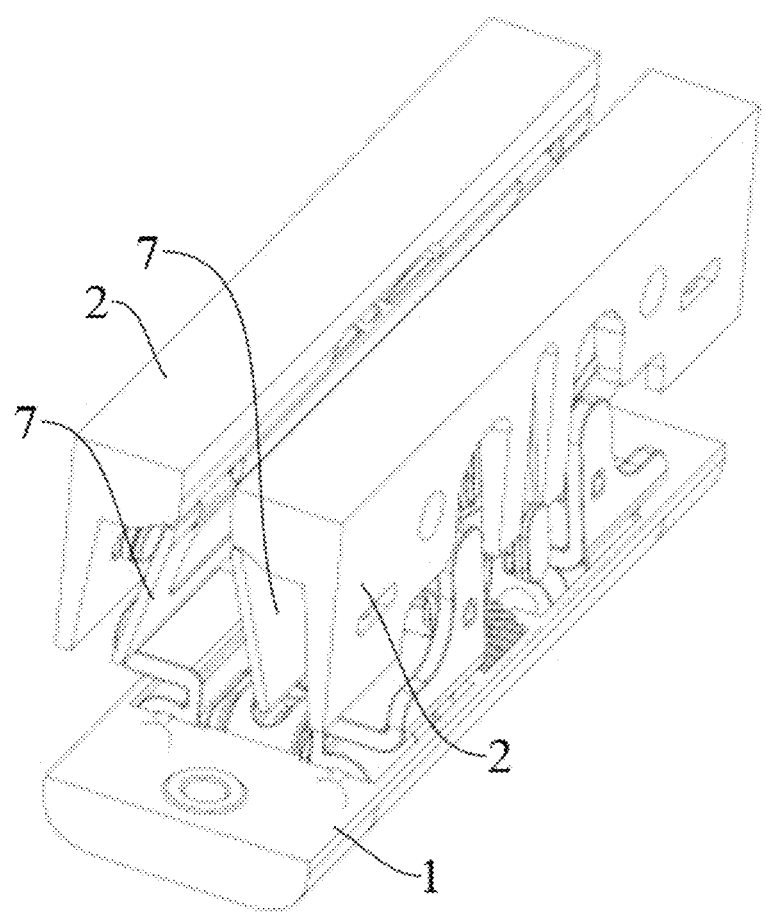
FIG. 16 is a schematic view of a coupling device in a closed state according to an embodiment of the present disclosure.

As shown in FIG. 3 and FIG. 13, in some embodiments, the first transmission assembly 3 includes a first transmission member 31 and a second transmission member 32. The first transmission member 31 is a helical gear shaft with a first helical tooth portion and is arranged along the second direction, and the first helical tooth portion is located at a middle position of the helical gear shaft. The second transmission member 32 is a helical gear with a second helical tooth portion. The first helical tooth portion meshes with the second helical tooth portion. The rotation of the second middle frame fixing member 2 may drive the first transmission member 31 to rotate, and in turn the first transmission member 31 drives the second transmission member 32 to rotate.

Further, the first end of the second transmission assembly 4 is hinged to the second transmission member 32 at the first hinge center C1, and the rotation center C2 of the second transmission member 32 does not coincide with the first hinge center C1. In other words, the first hinge center C1 is located on the second transmission member 32, and the first hinge center C1 is different from the rotation center C2 of the second transmission member 32. The second transmission member 32 may drive the first end of the second transmission assembly 4 to rotate with a larger rotation radius when the second transmission member 32 rotates. The second end of the second transmission assembly 4 is slidably coupled to the first transmission member 31. Therefore, the second transmission assembly 4 and the first transmission assembly 3 form a crank connecting rod mechanism. The second transmission assembly 4 may convert the rotation action of the second transmission member 32 into the moving action along the second direction.

As shown in FIG. 4, specifically, the second transmission assembly 4 includes a synchronization member 41, a shaft sleeve 42 and a linkage 43. The synchronization member 41 is slidably coupled to the first transmission member 31, the first end of the third transmission assembly 5 is hinged to the synchronization member 41, and the synchronization member 41 may drive the third transmission assembly 5 to rotate when sliding on the first transmission member 31 along the second direction, so that the middle frame fixing member 2 is driven to move towards the first side facing away from the first transmission assembly 3 or the second side towards the first transmission assembly 3.

The shaft sleeve 42 is slidably coupled to the first transmission member 31, and the shaft sleeve 42 is coupled to the synchronization member 41. A first end of the linkage 43 is hinged to the second transmission member 32 at the first hinge center C1, and a second end of the linkage 43 is hinged to the shaft sleeve 42. Therefore, the rotation of the second transmission member 32 drives the first end of the linkage 43 to rotate, and the second end of the linkage 43 slides synchronously on the first transmission member 31 along the second direction and drives the synchronization member 41 to slide along the second direction simultaneously.

It should be noted that the synchronization member 41 includes a first synchronization sub-member 411 and a second synchronization sub-member 412, and the first synchronization sub-member 411 and the second synchronization sub-member 412 are slidably arranged at two ends of the first transmission member 31 in the second direction. One or two, preferably two, third transmission assembles 5 may be provided. Respective first ends of the two third transmission assemblies 5 are hinged to the first synchronization sub-member 411 and the second synchronization sub-member 412.

Figure 9:
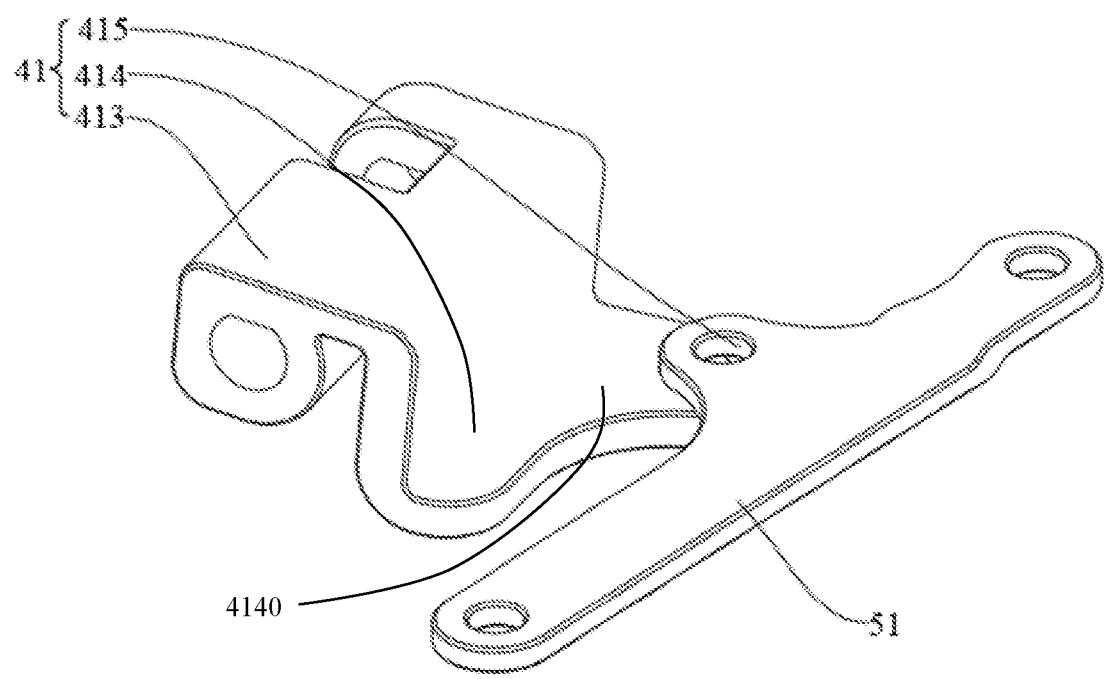
FIG. 9 is a schematic view showing that a synchronization member and a swing arm are assembled with each other according to an embodiment of the present disclosure.

As shown in FIG. 9, the synchronization member 41 includes a first sliding portion 413, a first connection portion 414, and a first hinge portion 415. The first sliding portion 413 has a hollow structure with an opening, and the opening of the first sliding portion 413 extends in the second direction. A side wall of the first sliding portion 413 includes a notch towards a side of the shaft sleeve 42, the first sliding portion 413 and the shaft sleeve 42 are slidably fitted over the first transmission assembly 3, and the shaft sleeve 42 is snapped in the notch, so that the shaft sleeve 42 may drive the first sliding portion 413 to slide synchronously along the first transmission member 31.

The first connection portion 414 extends from the side wall of the first sliding portion 413 to a side facing away from the notch. The first connection portion 414 exhibits a step structure, and a biasing structure 4140 is arranged at a position of the first connection portion 414 close to the first hinge portion 415. The first hinge portion 415 is located at an end of the first connection portion 414 away from the first sliding portion 413, and the first hinge portion 415 is hinged to the first end of the third transmission assembly 5, preferably by a pin connection.

Similarly, the shaft sleeve 42 includes a first shaft sub-sleeve 421 and a second shaft sub-sleeve 422, and the first shaft sub-sleeve 421 and the second shaft sub-sleeve 422 are arranged corresponding to the first synchronization sub-member 411 and the second synchronization sub-member 412. The first shaft sub-sleeve 421 and the second shaft sub-sleeve 422 are slidably arranged at the two ends of the first transmission member 31 in the second direction, the first shaft sub-sleeve 421 is snapped in a notch of the first synchronization sub-member 411, and the second shaft sub-sleeve 422 is snapped in a notch of the second synchronization sub-member 412.

Figure 6:
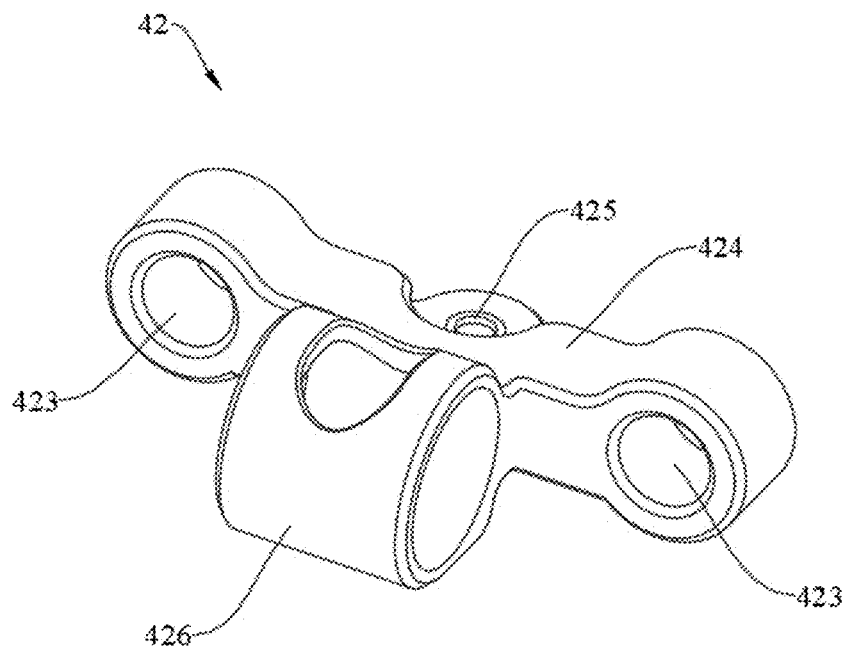
FIG. 6 is a schematic view of a shaft sleeve according to an embodiment of the present disclosure.

As shown in FIG. 6, specifically, the shaft sleeve 42 includes a second sliding portion 423, a second connection portion 424, and a second hinge portion 425. A structure of the second sliding portion 423 is similar to a structure of the first sliding portion 413, and is also a hollow structure with an opening, and the opening of the second sliding portion 423 extends in the second direction. The second sliding portion 423 is slidably fitted over the first transmission assembly 3 and snapped in the notch of the first sliding portion 413.

The second connection portion 424 is coupled to the second sliding portion 423 and extends in a first direction D1 (as shown in FIGS. 3-4) towards a side facing away from the first sliding portion 413. The second hinge portion 425 is located at a side of the second connection portion 424 facing away from the second transmission member 32 and hinged to the second end of the linkage 43, preferably by a pin connection.

Correspondingly, the linkage 43 includes a first sub-linkage 431 and a second sub-linkage 432, and the first sub-linkage 431 and the second sub-linkage 432 correspond to the first shaft sub-sleeve 421 and the second shaft sub-sleeve 422. A first end of the first sub-linkage 431 is hinged to the second transmission member 32, and a second end of the first sub-linkage 431 is hinged to the second hinge portion 425 of the first shaft sub-sleeve 421. A first end of the second sub-linkage 432 is hinged to the second transmission member 32, and a second end of the second sub-linkage 432 is hinged to the second hinge portion 425 of the second shaft sub-sleeve 422.

Figure 10:
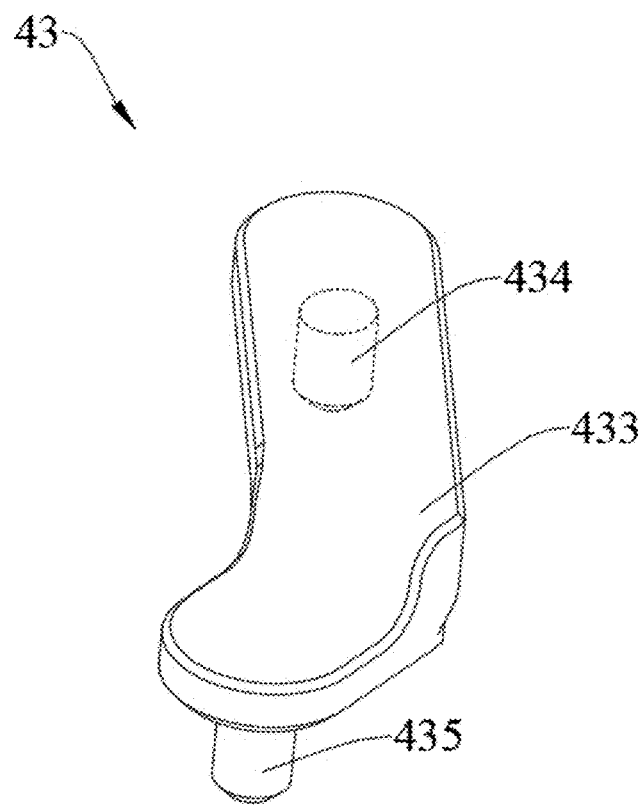
FIG. 10 is a schematic view of a linkage according to an embodiment of the present disclosure.

As shown in FIG. 10, the linkage 43 includes a third connection portion 433, a first protrusion 434, and a second protrusion 435. The third connection portion 433 has a bent strip structure. The first protrusion 434 is arranged on a lower surface of a first end of the third connection portion 433, and the first protrusion 434 is hinged to the second transmission member 32. The second protrusion 435 is arranged on a lower surface of a second end of the third connection portion 433, and the second protrusion 435 is hinged to the second hinge portion 425. It should be noted that the third connection portion 433 may also use a through hole to replace the first protrusion 434 and the second protrusion 435, and the second hinge portion 425 includes a protrusion corresponding to the through hole, so that the same purpose may also be achieved.

In some embodiments, the third transmission assembly 5 includes a swing arm 51 and a sliding block 53. The swing arm 51 has a first end, a second end and a third end, and these three ends are arranged in a triangle. The first end of the swing arm 51 is hinged to the first hinge portion 415, the second end of the swing arm 51 is slidably coupled to the middle frame fixing member 2 along the second direction, the sliding block 53 is slidably coupled to the middle frame fixing member 2 along the first direction, and the third end of the swing arm 51 is hinged to the sliding block 53.

Thus, the synchronization member 41 drives the first end of the swing arm 51 to slide along the second direction when the synchronization member 41 slides along the second direction. At the same time, the second end of the swing arm 51 slides along the second direction on the middle frame fixing member 2, and the third end of the swing arm 51 slides along the first direction on the middle frame fixing member 2 through the sliding block 53, i.e., the third end of the swing arm 51 drives the middle frame fixing member 2 to move towards the first side facing away from the first transmission assembly 3 or the second side towards the first transmission assembly 3.

Similarly, the swing arm 51 includes a first swing sub-arm 511 and a second swing sub-arm 512, and the first swing sub-arm 511 and the second swing sub-arm 512 correspond to the first synchronization sub-member 411 and the second synchronization sub-member 412. The first end of the first swing sub-arm 511 is hinged to the first hinge portion 415 of the first synchronization sub-member 411, the first end of the second swing sub-arm 512 is hinged to the first hinge portion 415 of the second synchronization sub-member 412, and the third end of the first swing sub-arm 511 and the third end of the second swing sub-arm 512 are each hinged to the sliding block 53. The hinge mode is preferably a pin connection.

Figure 8:
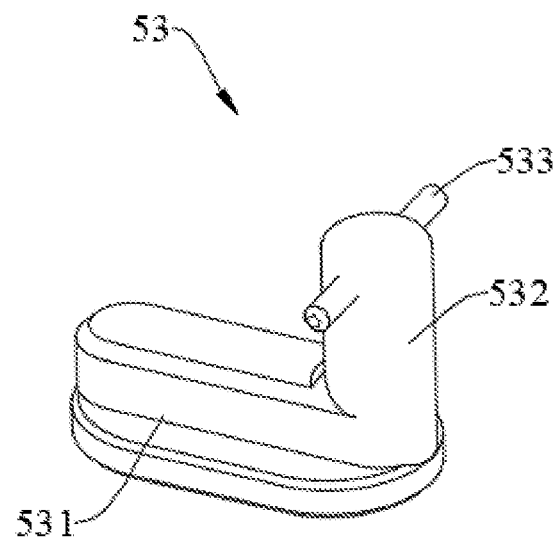
FIG. 8 is a schematic view of a sliding block according to an embodiment of the present disclosure.

As shown in FIG. 8, in some embodiments, the sliding block 53 includes a sliding block body 531 and a connection segment 532. The middle frame fixing member 2 includes a sliding groove along the first direction, and the sliding block body 531 is slidably arranged in the sliding groove. The connection segment 532 is coupled to the sliding block body 531, and the connection segment 532 passes through the third end of the first swing sub-arm 511 and the third end of the second swing sub-arm 512.

The connection segment 532 successively passes through the third end of the first swing sub-arm 511 and the third end of the second swing sub-arm 512, to make them rotatably coupled. That is, the third end of the first swing sub-arm 511 and the third end of the second swing sub-arm 512 may rotate around the connection segment 532. The third end of the first swing sub-arm 511 and the third end of the second swing sub-arm 512 rotate around the connection segment 532 when the sliding block body 531 slides in the sliding groove. In other words, the third end of the first swing sub-arm 511 and the third end of the second swing sub-arm 512 may drive the sliding block body 531 to slide in the sliding groove along the first direction and hence push the middle frame fixing member 2 to move along the first direction, when the first swing sub-arm 511 rotates relative to the first synchronization sub-member 411 and the second swing sub-arm 512 rotates relative to the second synchronization sub-member 412.

Figure 11:
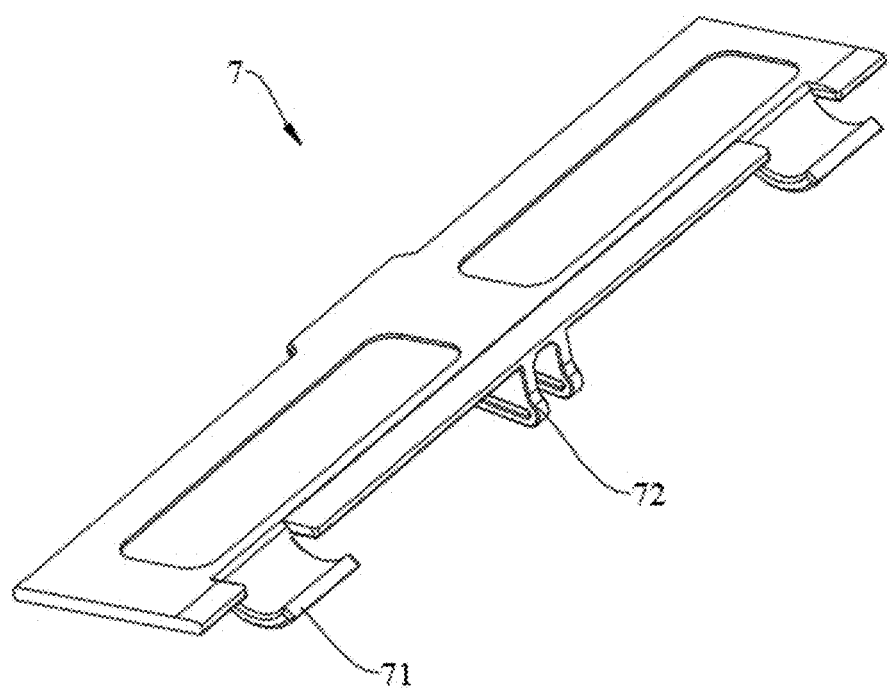
FIG. 11 is a schematic view of a support member according to an embodiment of the present disclosure.
Figure 12:
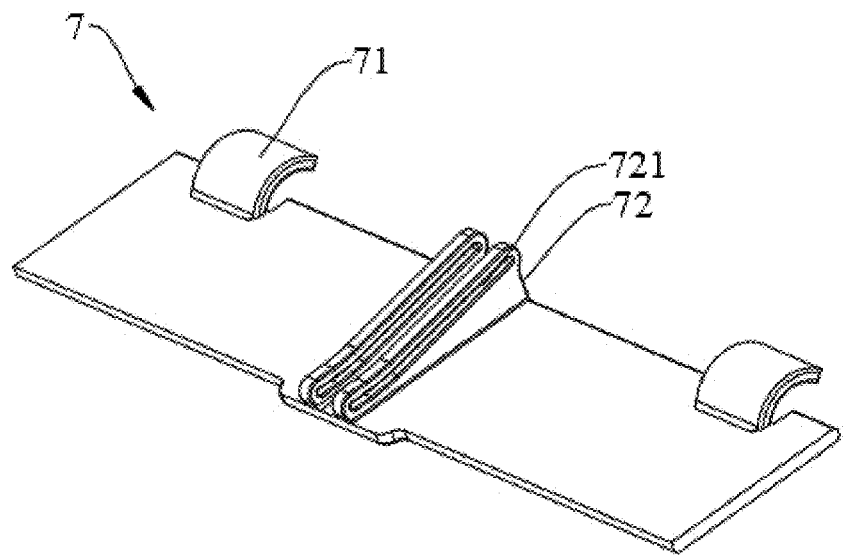
FIG. 12 is another schematic view of a support member according to an embodiment of the present disclosure.
Figure 17:
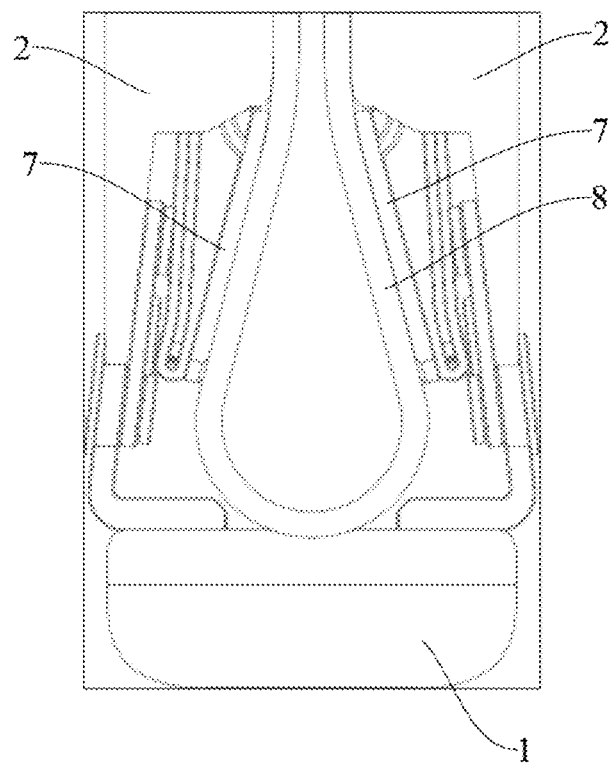
FIG. 17 is a partially enlarged view of a coupling device in a closed state according to an embodiment of the present disclosure.
Figure 18:
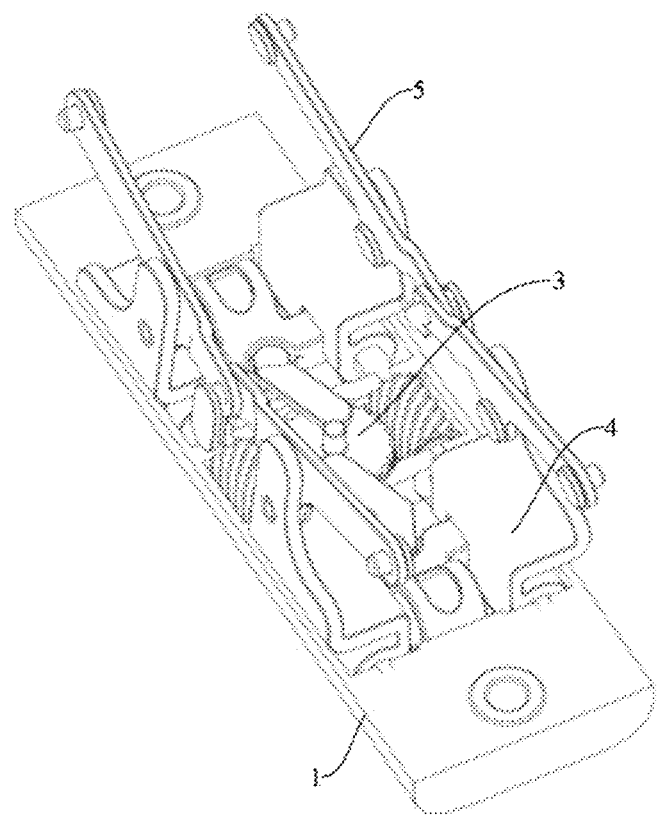
FIG. 18 is another schematic view of a coupling device in a closed state according to an embodiment of the present disclosure.

As shown in FIG. 11, FIG. 12 and FIG. 17, in some embodiments, the coupling device 100 further includes a support member 7. The support member 7 has a plate-shaped structure and supports the screen 8. A side of the support member 7 away from the first transmission assembly 3 in the first direction includes an arc insert 71, the middle frame fixing member 2 includes an arc groove 211, and the insert 71 is rotatably fitted in the arc groove 211. The third transmission assembly 5 is slidably coupled to the support member 7 to drive the support member 7 to rotate relative to the middle frame fixing member 2.

The insert 71 is rotatably fitted in the arc groove 211, so that the support member 7 may rotate along a track of the arc groove 211 when the middle frame fixing member 2 is in different positions. Therefore, the support member 7 may guide the screen 8 to allow the screen 8 to be in a suitable state.

For example, the coupling device 100 according to the embodiments of the present disclosure is coupled to the screen 8 to form a foldable mobile phone or a foldable tablet computer. A surface of the support member 7 facing towards the screen 8 is parallel or substantially parallel to the screen 8 when the middle frame fixing member 2 is in a flattened state, so that the screen 8 is in an unfolded state. The surface of the support member 7 facing towards the screen 8 is an inclined surface when the middle frame fixing member 2 is in a closed position. The support member 7 guides the screen 8 to a bent shape, and the support member 7 provides an appropriate placement space for a bent position of the screen 8.

As shown in FIGS. 14 to 17, FIG. 23 and FIG. 24, in some embodiments, a rib plate 72 is arranged at a side of the support member 7 adjacent to the middle frame fixing member 2, and the rib plate 72 extends in the first direction. The rib plate 72 includes an inclined sliding groove 721, and the inclined sliding groove 721 is inclined along a direction away from the first transmission assembly and towards a direction away from the support member 7 in the first direction. The connection segment 532 includes a groove shaft 533, and the groove shaft 533 is slidably fitted in the inclined sliding groove 721.

Thus, the groove shaft 533 may drive the support member 7 to rotate relative to the middle frame fixing member 2 when sliding in the inclined sliding groove 721. As a result, it is ensured that the surface of the support member 7 facing towards the screen 8 is parallel or substantially parallel to the screen 8 when the middle frame fixing member 2 is in the flattened state, and the support member 7 guides the screen 8 to the bent shape and provides the appropriate placement space for the bent position of the screen 8 when the middle frame fixing member 2 is in the closed state.

Figure 19:
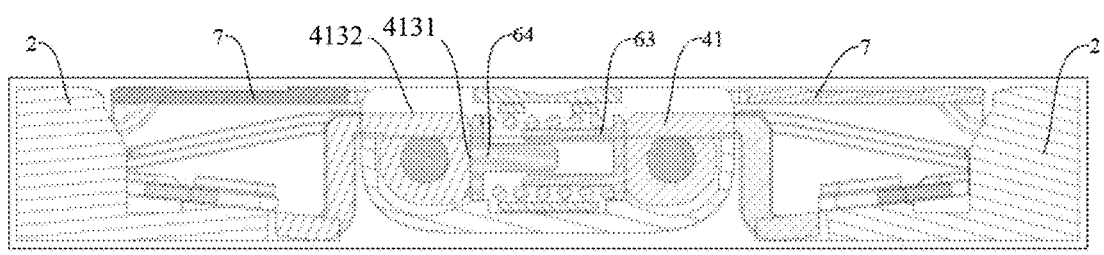
FIG. 19 is a sectional view of a coupling device in a flattened state according to an embodiment of the present disclosure.
Figure 20:
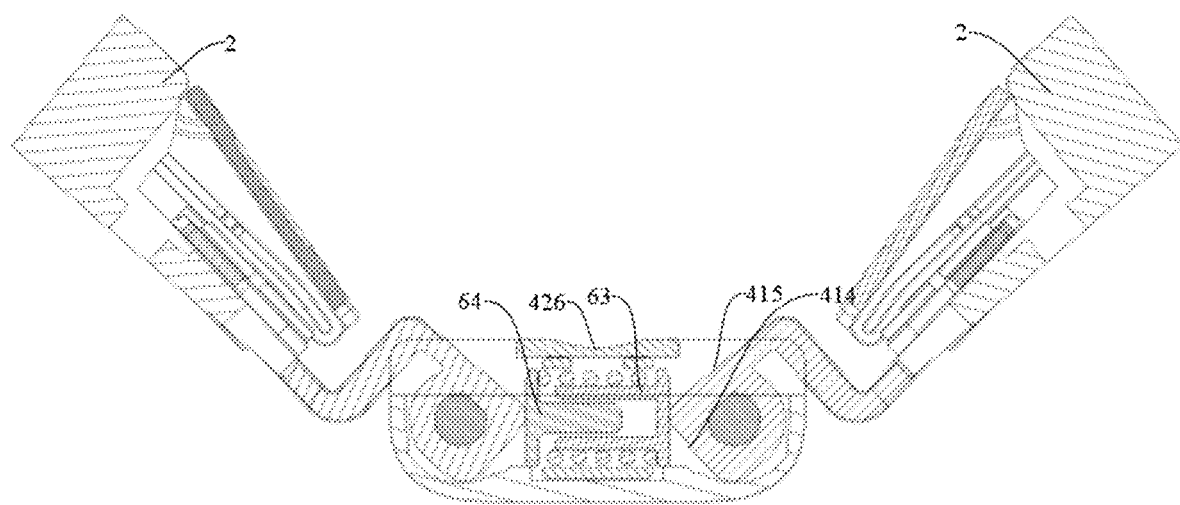
FIG. 20 is a sectional view showing that a coupling device rotates from a flattened state to a closed state according to an embodiment of the present disclosure.
Figure 21:
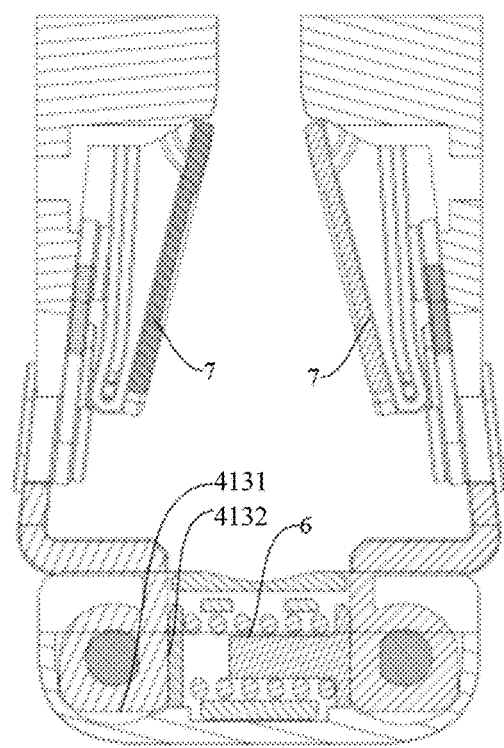
FIG. 21 is a sectional view of a coupling device in a closed state according to an embodiment of the present disclosure.
Figure 22:
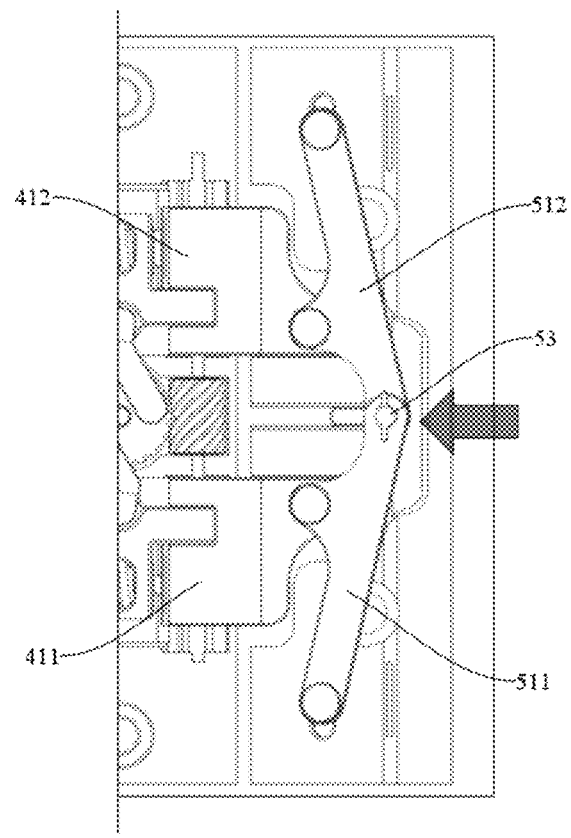
FIG. 22 is a schematic view showing a transmission principle of a third transmission assembly according to an embodiment of the present disclosure.
Figure 23:
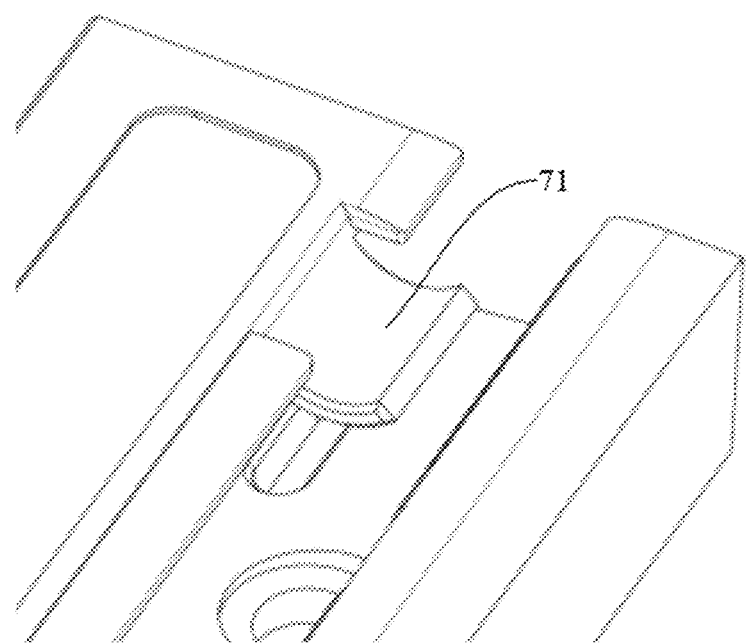
FIG. 23 is a schematic view of a support member and a middle frame fixing member according to an embodiment of the present disclosure.
Figure 24:
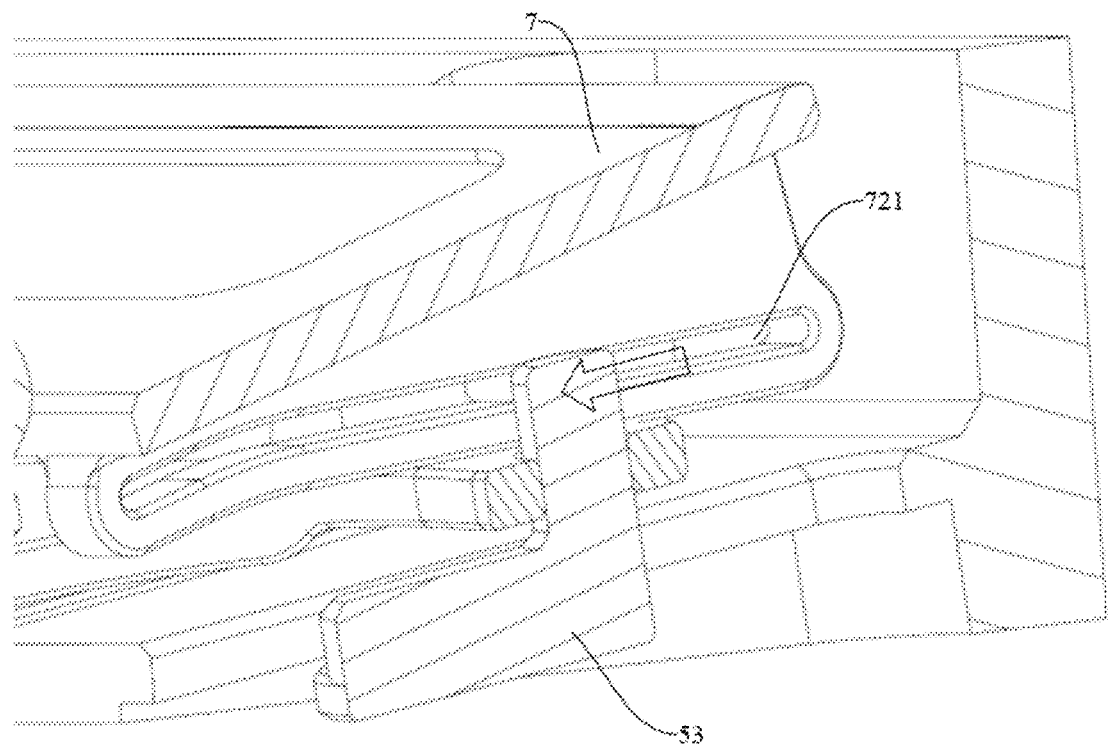
FIG. 24 is a sectional view showing that a support member and a sliding block are in an assembled state according to an embodiment of the present disclosure.

As shown in FIGS. 19 to 21, in some embodiments, the coupling device 100 further includes a locking assembly 6 for locking the middle frame fixing member 2. The locking assembly 6 is slidably coupled to the second transmission assembly 4 along the first direction. The second transmission assembly 4 at least includes a first side wall 4131 and a second side wall 4132. The locking assembly 6 locks the middle frame fixing member 2 in a first position when the locking assembly 6 abuts against the first side wall 4131 of the second transmission assembly 4. The locking assembly 6 locks the middle frame fixing member 2 in a second position when the locking assembly 6 abuts against the second side wall 4132 of the second transmission assembly 4.

It may be understood that the middle frame fixing member 2 is rotatable between the first position and the second position, and the locking assembly 6 may lock the middle frame fixing member 2 in the first position or the second position. In some embodiments, the locking assembly 6 includes a first locking sub-assembly 61 and a second locking sub-assembly 62. The first locking sub-assembly 61 is slidably coupled to the first shaft sub-sleeve 421 along the first direction, and the first locking sub-assembly 61 corresponds to the first synchronization sub-member 411. The second locking sub-assembly 62 is slidably coupled to the second shaft sub-sleeve 422 along the first direction, and the second locking sub-assembly 62 corresponds to the second synchronization sub-member 412.

The locking assembly 6 includes a first stop member 63 and a second stop member 64. The first stop member 63 is slidably arranged on the shaft sleeve 42 of the second transmission assembly 4 along the first direction, the second stop member 64 is slidably arranged on the shaft sleeve 42 of the second transmission assembly 4 along the first direction, and the first stop member 63 or the second stop member 64 abuts against the synchronization member 41 of the second transmission assembly 4.

The locking assembly 6 locks the middle frame fixing member 2 in the first position when the first stop member 63 or the second stop member 64 abuts against the first side wall 4131 of the second transmission assembly 4. The locking assembly 6 locks the middle frame fixing member 2 in the second position when the first stop member 63 or the second stop member 64 abuts against the second side wall 4132 of the second transmission assembly 4.

Figure 7:
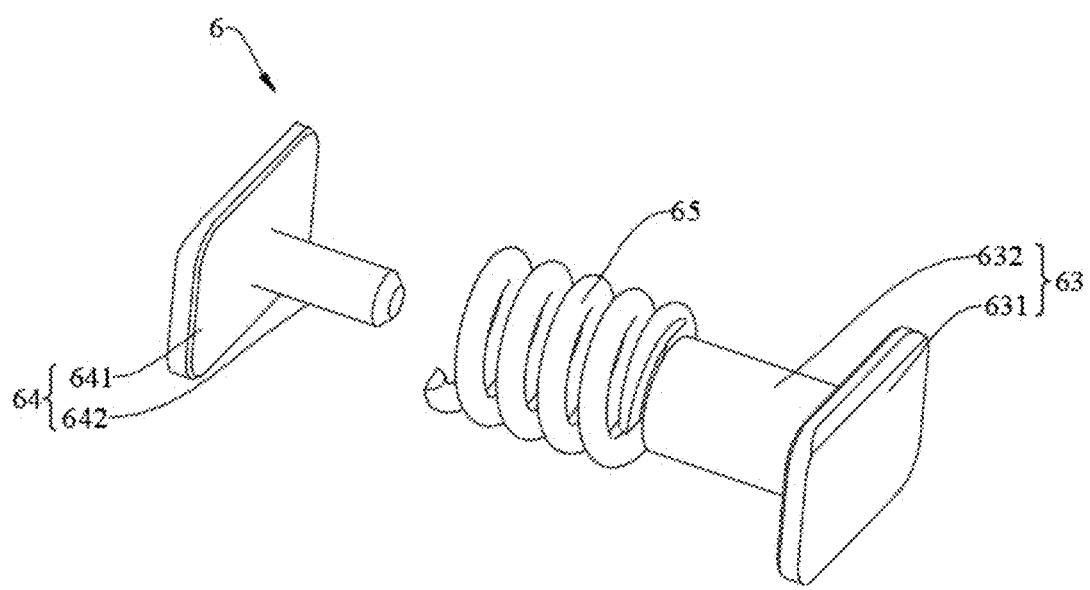
FIG. 7 is a schematic view of a locking assembly according to an embodiment of the present disclosure.

As shown in FIG. 7, specifically, the first stop member 63 includes a first stop portion 631 and a first accommodating portion 632 coupled to each other. The shaft sleeve 42 of the second transmission assembly 4 includes a second accommodating portion 426 arranged along the first direction, the first stop portion 631 is arranged at a first end of the second accommodating portion 426, and the first accommodating portion 632 is located in the second accommodating portion 426. The second stop member 64 includes a second stop portion 641 and a third sliding portion 642 coupled to each other. The second stop portion 641 is arranged at a second end of the second accommodating portion 426, and the third sliding portion 642 is slidably fitted in the first accommodating portion 632. It may be understood that the first stop portion 631 and the second stop portion 641 are arranged at two ends of the shaft sleeve 42 correspondingly and may slide relative to each other in the first direction.

The locking assembly 6 further includes an elastic portion 65, and the elastic portion 65 is preferably a spring. The elastic portion 65 is located in the second accommodating portion 426 of the shaft sleeve 42 and fitted over an outer side of the first accommodating portion 632. A first end of the elastic portion 65 abuts against the first stop portion 631 and a second end of the elastic portion 65 abuts against the second stop portion 641.

The first sliding portion 413 has the first side wall 4131 and the second side wall 4132, and an extension surface of the first side wall 4131 is perpendicular to an extension surface of the second side wall 4132. In the first position, the first side wall 4131 abuts against the first stop portion 631 or the second stop portion 641; and in the second position, the second side wall 4132 abuts against the first stop portion 631 or the second stop portion 641. Thus, the first side wall 4131 abuts against the first stop portion 631 or the second stop portion 641 in a face-to-face contact manner when the middle frame fixing member 2 is in the first position, so that positions of the first synchronization sub-member 411 and the second synchronization sub-member 412 are relatively stable. The second side wall 4132 abuts against the first stop portion 631 or the second stop portion 641 in a face-to-face contact manner when the middle frame fixing member 2 is in the second position, so that positions of the first synchronization sub-member 411 and the second synchronization sub-member 412 are relatively stable.

It should be noted that a compression amount of the elastic portion 65 is small when the first side wall 4131 or the second side wall 4132 abuts against the first stop portion 631 or the second stop portion 641. Under an elastic action of the elastic portion 65, the first transmission member 31 may not rotate and hence can realize a locking function. Only under an action of an external force, the first transmission member 31 may rotate. When a corner between the first side wall 4131 and the second side wall 4132 abuts against the first stop portion 631 or the second stop portion 641, the compression amount of the elastic portion 65 is larger, in which case the first transmission member 31 cannot keep locked, and the elastic portion 65 pushes the first transmission member to rotate by the first side wall 4131 or the second side wall 4132 until the first transmission member rotates to the first position or the second position. Thus, users may feel a sense of damping when rotating the middle frame fixing member 2.

In some embodiments, the middle frame fixing member 2 includes a middle frame fixing member body 21, a fourth connection portion 22, and a fifth connection portion 23. The middle frame fixing member body 21 is configured to couple the support member 7. The fourth connection portion 22 and the fifth connection portion 23 are arranged at a side of the middle frame fixing member body 21 adjacent to the third transmission assembly 5, and the fifth connection portion 23 and the fourth connection portion 22 are spaced apart in the second direction.

The fourth connection portion 22 includes a sliding groove extending in the second direction, and the second end of the third transmission assembly 5 is slidably fitted in the sliding groove of the fourth connection portion 22. The fifth connection portion 23 includes a sliding groove extending in the first direction, and the third end of the third transmission assembly 5 is slidably fitted in the sliding groove of the fifth connection portion 23.

It should be noted that two fourth connection portions 22 are arranged at two sides of the fifth connection portion 23, and two fifth connection portions 23 are coupled to the second end of the first swing sub-arm 511 and the second end of the second swing sub-arm 512 correspondingly.

In some embodiments, the coupling device 100 further includes a shaft cover 1, the first transmission assembly 3 is hinged to the shaft cover 1, and the first transmission assembly 3 and at least part of the second transmission assembly 4 are arranged in the shaft cover 1.

In some embodiments, two middle frame fixing members 2 and two support members 7 are arranged at two sides of the shaft cover 1 in the first direction. Moreover, according to the number of middle frame fixing members 2, some structures of the first transmission assembly 3, the second transmission assembly 4 and the third transmission assembly 5 are symmetrical, such as the first transmission member 31, the synchronization member 41 and the swing arm 51; and some other structures are provided in a singular form, such as the second transmission member 32. That is, two symmetrical first transmission members 31 are rotatably coupled to one second transmission member 32.

As shown in FIG. 1, the present disclosure further proposes a terminal equipment 200, and the terminal equipment 200 includes a coupling device 100 according to any of the above embodiments.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are only for convenience of description and do not indicate or imply that the device or element referred to must have a particular orientation, or be constructed and operated in a particular orientation. Thus, these terms shall not be construed as limitation on the present disclosure.

In addition, terms such as "first" and "second" are merely used for descriptive purposes and cannot be understood as indicating or implying relative importance or the number of technical features indicated. Thus, the features defined with "first" and "second" may explicitly or implicitly include at least one of the features. In the description of the present disclosure, unless otherwise specifically defined, "a plurality of" means at least two, such as two, three, etc.

In the present disclosure, unless otherwise explicitly specified and defined, the terms "mounted," "interconnected," "connected," "fixed" and the like are used broadly, and may be, for example, fixed connections, detachable connections, or integral connections; may also be mechanical or electrical connections or intercommunication; may also be direct connections or indirect connections via intervening structures; may also be inner communications or interactions of two elements, which can be understood by those skilled in the art according to specific situations, unless otherwise explicitly specified.

In the present disclosure, unless otherwise explicitly specified and defined, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below,"

"under," or "on bottom of" the second feature, or just means that the first feature is at a height lower than that of the second feature.

In the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the embodiments of the present disclosure have been shown and described above, it can be understood that the above embodiments are exemplary and shall not be understood as limitation to the present disclosure, and changes, modifications, alternatives and variations can be made in the above embodiments within the scope of the present disclosure by those skilled in the art.

What is claimed is:

1. A coupling device, comprising:
   a middle frame fixing member;
   a first transmission assembly rotatable relative to the middle frame fixing member during rotation of the middle frame fixing member;
   a second transmission assembly having a first end hinged to the first transmission assembly at a first hinge center and having a second end slidably coupled to the first transmission assembly, wherein a rotation center of the first transmission assembly does not coincide with the first hinge center, and the second transmission assembly and the first transmission assembly form a crank connecting rod mechanism, and the second transmission assembly converts a rotation action of the first transmission assembly into a moving action of the second transmission assembly along a second direction; and
   a third transmission assembly having a first end hinged to the second transmission assembly and having a second end and a third end both slidably coupled to the middle frame fixing member, wherein the second end and the third end of the third transmission assembly are on two sides of the first end of the third transmission assembly, and the third end of the third transmission assembly pushes the middle frame fixing member to move towards a first side facing away from the first transmission assembly or a second side towards the first transmission assembly during the rotation of the middle frame fixing member.

2. The coupling device according to claim 1, wherein the first transmission assembly comprises:
   a first transmission member comprising a first helical tooth portion; and
   a second transmission member comprising a second helical tooth portion meshing with the first helical tooth portion, the second transmission member being rotatable relative to the first transmission member through the first helical tooth portion and the second helical tooth portion, and the first end of the second transmission assembly being hinged to the second transmission member at the first hinge center;
   wherein a rotation center of the second transmission member is the rotation center of the first transmission assembly and does not coincide with the first hinge center, the second end of the second transmission assembly is slidably coupled to the first transmission member, and the second transmission assembly converts a rotation action of the second transmission member into the moving action of the second transmission assembly along the second direction.

3. The coupling device according to claim 2, wherein the second transmission assembly comprises:
   a synchronization member slidably coupled to the first transmission member, the first end of the third transmission assembly being hinged to the synchronization member;
   a shaft sleeve slidably coupled to the first transmission member and coupled to the synchronization member; and
   a linkage having a first end hinged to the second transmission member at the first hinge center and having a second end hinged to the shaft sleeve.

4. The coupling device according to claim 3, wherein the synchronization member comprises: a first synchronization sub-member and a second synchronization sub-member slidably arranged at two ends of the first transmission member in the second direction; and
   there are two third transmission assemblies, and first ends of the two third transmission assemblies are hinged to the first synchronization sub-member and the second synchronization sub-member, respectively.

5. The coupling device according to claim 4, wherein the synchronization member comprises:
   a first sliding portion having a hollow structure with an opening, the opening of the first sliding portion extending in the second direction, a side wall of the first sliding portion comprising a notch towards a side of the shaft sleeve, the first sliding portion and the shaft sleeve being slidably fitted over the first transmission assembly, and the shaft sleeve being snapped in the notch;
   a first connection portion extending from the side wall of the first sliding portion to a side facing away from the notch; and
   a first hinge portion located on the first connection portion and hinged to the first end of the third transmission assembly.

6. The coupling device according to claim 5, wherein the first connection portion has a step structure, and a biasing structure is arranged at a position of the first connection portion close to the first hinge portion.

7. The coupling device according to claim 5, wherein the shaft sleeve comprises:
   a first shaft sub-sleeve and a second shaft sub-sleeve slidably arranged at the two ends of the first transmission member in the second direction, the first shaft sub-sleeve being snapped in a notch of the first synchronization sub-member, and the second shaft sub-sleeve being snapped in a notch of the second synchronization sub-member.

8. The coupling device according to claim 7, wherein each of the first shaft sub-sleeve and the second shaft sub-sleeve comprises:
   a second sliding portion having a hollow structure with an opening, the opening of the second sliding portion extending in the second direction, and the second sliding portion being slidably fitted over the first transmission assembly and snapped in the notch of the first sliding portion;
a second connection portion coupled to the second sliding portion and extending in a first direction towards a side facing away from the first sliding portion; and
a second hinge portion located on the second connection portion and hinged to the second end of the linkage.

9. The coupling device according to claim 8, wherein the linkage comprises:
a first sub-linkage, a first end of the first sub-linkage being hinged to the second transmission member, and a second end of the first sub-linkage being hinged to the second hinge portion of the first shaft sub-sleeve; and
a second sub-linkage, a first end of the second sub-linkage being hinged to the second transmission member, and a second end of the second sub-linkage is hinged to the second hinge portion of the second shaft sub-sleeve.

10. The coupling device according to claim 9, wherein each of the first sub-linkage and the second sub-linkage comprises:
a third connection portion having a bent strip structure;
a first protrusion arranged on a lower surface of a first end of the third connection portion and hinged to the second transmission member; and
a second protrusion arranged on a lower surface of a second end of the third connection portion and hinged to the second hinge portion.

11. The coupling device according to claim 5, wherein the third transmission assembly comprises:
a swing arm having a first end hinged to the first hinge portion and a second end slidably coupled to the middle frame fixing member along the second direction; and
a sliding block slidably coupled to the middle frame fixing member along the first direction, a third end of the swing arm being hinged to the sliding block.

12. The coupling device according to claim 11, wherein the swing arm comprises:
a first swing sub-arm, a first end of the first swing sub-arm being hinged to the first hinge portion of the first synchronization sub-member; and
a second swing sub-arm, a first end of the second swing sub-arm being hinged to the first hinge portion of the second synchronization sub-member,
wherein a third end of the first swing sub-arm and a third end of the second swing sub-arm are hinged to the sliding block.

13. The coupling device according to claim 12, wherein the sliding block comprises:
a sliding block body, the middle frame fixing member having a sliding groove along the first direction, and the sliding block body being slidably arranged in the sliding groove; and
a connection segment coupled to the sliding block body and passing through the third end of the first swing sub-arm and the third end of the second swing sub-arm.

14. The coupling device according to claim 13, further comprising a support member,
wherein a side of the support member away from the first transmission assembly in the first direction comprises an arc insert, the middle frame fixing member comprises an arc groove, the insert is rotatably fitted in the arc groove, and third transmission assembly is slidably coupled to the support member to drive the support member to rotate relative to the middle frame fixing member.

15. The coupling device according to claim 14, wherein:
a rib plate is arranged at a side of the support member adjacent to the middle frame fixing member and extends in the first direction;
the rib plate comprises an inclined sliding groove, and the inclined sliding groove is inclined along a direction away from the first transmission member and towards a direction away from the support member in the first direction;
the connection segment comprises a groove shaft, and the groove shaft is slidably fitted in the inclined sliding groove.

16. The coupling device according to claim 7, further comprising a locking assembly slidably coupled to the second transmission assembly along the first direction, wherein:
the second transmission assembly at least comprises a first side wall and a second side wall,
the locking assembly locks the middle frame fixing member in a first position when the locking assembly abuts against the first side wall of the second transmission assembly, and
the locking assembly locks the middle frame fixing member in a second position when the locking assembly abuts against the second side wall of the second transmission assembly.

17. The coupling device according to claim 16, wherein the locking assembly comprises:
a first locking sub-assembly slidably coupled to the first shaft sub-sleeve along the first direction; and
a second locking sub-assembly slidably coupled to the second shaft sub-sleeve along the first direction.

18. The coupling device according to claim 16, wherein the locking assembly comprises:
a first stop member slidably arranged on the shaft sleeve of the second transmission assembly along the first direction; and
a second stop member slidably arranged on the shaft sleeve of the second transmission assembly along the first direction,
wherein the first stop member or the second stop member abuts against the synchronization member of the second transmission assembly;
the locking assembly locks the middle frame fixing member in the first position when the first stop member or the second stop member abuts against the first side wall of the second transmission assembly; and
the locking assembly locks the middle frame fixing member in the second position when the first stop member or the second stop member abuts against the second side wall of the second transmission assembly.

19. The coupling device according to claim 18, wherein:
the first stop member comprises a first stop portion and a first accommodating portion coupled to each other, and the shaft sleeve of the second transmission assembly comprises a second accommodating portion along the first direction, the first stop portion being arranged at a first end of the second accommodating portion, and the first accommodating portion being located in the second accommodating portion;
the second stop member comprises a second stop portion and a third sliding portion coupled to each other, the second stop portion being arranged at a second end of the second accommodating portion, and the third sliding portion being slidably fitted in the first accommodating portion; and the locking assembly further comprises an elastic portion located in the second accommodating portion and fitted over an outer side of the first accommodating portion, a first end of the elastic portion abutting against the first stop portion, and a second end of the elastic portion abutting against the second stop portion.

20. Terminal equipment, comprising:

a screen; and a coupling device coupled to the screen, wherein the coupling device comprises:

a middle frame fixing member;

a first transmission assembly rotatable relative to the middle frame fixing member during rotation of the middle frame fixing member;

a second transmission assembly having a first end hinged to the first transmission assembly at a first hinge center and having a second end slidably coupled to the first transmission assembly, wherein a rotation center of the first transmission assembly does not coincide with the first hinge center, and the second transmission assembly and the first transmission assembly form a crank connecting rod mechanism, and the second transmission assembly converts a rotation action of the first transmission assembly into a moving action of the second transmission assembly along a second direction; and a third transmission assembly having a first end hinged to the second transmission assembly and having a second end and a third end both slidably coupled to the middle frame fixing member, wherein the second end and the third end of the third transmission assembly are on two sides of the first end of the third transmission assembly, and the third end of the third transmission assembly pushes the middle frame fixing member to move towards a first side facing away from the first transmission assembly or a second side towards the first transmission assembly during the rotation of the middle frame fixing member.

* * * * *